United States Patent
Tseng et al.

(10) Patent No.: US 10,310,629 B2
(45) Date of Patent: Jun. 4, 2019

(54) JOYSTICK-TYPE MOUSE

(71) Applicant: Primax Electronics Ltd., Taipei (TW)

(72) Inventors: Ying-Che Tseng, Taipei (TW); Cheng-Yi Tsai, Taipei (TW); A-Ming Chang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 177 days.

(21) Appl. No.: 15/651,716

(22) Filed: Jul. 17, 2017

(65) Prior Publication Data
US 2018/0253156 A1 Sep. 6, 2018

(30) Foreign Application Priority Data

Mar. 3, 2017 (TW) .............................. 106107020 A (51) Int. Cl.
| | |
|---|---|
| *G06F 3/0338* | (2013.01) |
| *G06F 3/02* | (2006.01) |
| *A63F 13/24* | (2014.01) |
| *G06F 3/038* | (2013.01) |
| *G06F 3/0354* | (2013.01) |

(52) U.S. Cl.
CPC ............ *G06F 3/0338* (2013.01); *A63F 13/24* (2014.09); *G06F 3/0202* (2013.01); *G06F 3/0383* (2013.01); *G06F 3/03543* (2013.01)

(58) Field of Classification Search
CPC ...... G06F 3/0202; G06F 3/0205; G06F 3/033; G06F 3/0338; G06F 3/0354; G06F 3/03541; G06F 3/03543; G06F 3/038; G06F 1/1684; G06F 1/1613; G06F 1/1615; G05G 9/02–10
See application file for complete search history.

(56) References Cited

U.S. PATENT DOCUMENTS

| | | | | |
|---|---|---|---|---|
| 5,982,356 | A * | 11/1999 | Akiyama | G06F 3/0338 345/156 |
| 6,480,184 | B1 * | 11/2002 | Price | G06F 3/03543 345/157 |
| 6,784,870 | B2 * | 8/2004 | Yin | G06F 1/1616 345/156 |
| 9,116,556 | B2 * | 8/2015 | Cheng | G06F 3/03543 |
| 9,684,387 | B2 * | 6/2017 | Wang | G06F 3/03543 |
| 2002/0167482 | A1 * | 11/2002 | Yin | G06F 1/1616 345/156 |
| 2003/0214484 | A1 * | 11/2003 | Haywood | G06F 3/0338 345/163 |
| 2004/0164962 | A1 * | 8/2004 | Yin | G06F 1/1616 345/163 |

(Continued)

*Primary Examiner* — Patrick F Marinelli
(74) *Attorney, Agent, or Firm* — Kirton McConkie; Evan R. Witt (57) ABSTRACT

A joystick-type mouse includes a main body and a mode detecting assembly. The main body includes a controlling module. The mode detecting assembly includes a coupling member, a posture sensor and a magnetic field sensor. A pivotal part is located at a first side of the coupling member and pivotally coupled with the main body. A magnetic part is located at a second side of the coupling member. The posture sensor and the magnetic field sensor are disposed within the main body and electrically connected with the controlling module. Consequently, the mouse can be switched to a joystick mode.

18 Claims, 5 Drawing Sheets

(56) References Cited

U.S. PATENT DOCUMENTS

2007/0132731 A1* 6/2007 Lin ..................... G06F 3/03543
                                                      345/163
2007/0273643 A1* 11/2007 Erez ..................... G06F 3/0338
                                                      345/156
2012/0188160 A1* 7/2012 Wallace ................ G06F 3/0338
                                                      345/161

* cited by examiner

JOYSTICK-TYPE MOUSE

FIELD OF THE INVENTION

The present invention relates to a mouse, and more particularly to a joystick-type mouse.

BACKGROUND OF THE INVENTION

With increasing development of science and technology, the existing video electronics products such as digital televisions or video game consoles are usually integrated with computer operating systems. Consequently, the video electronics products can also be used as simple computer operating systems. Consequently, the video electronics products can be used for editing simple electronic documents or video files. A mouse device can be applied to the computer system. In addition, the mouse device can be applied to the television or the video game console to increase the operating convenience.

Conventionally, a mouse comprises a casing, two buttons, a scroll wheel, two button sensors, an encoder, an optical sensor, a circuit board and a controller. The two buttons and the scroll wheel are installed on the casing. The scroll wheel is arranged between the two buttons. The button sensors, the encoder, the optical sensor, the circuit board and the controller are disposed within the casing. Moreover, the button sensors, the encoder, the optical sensor and the controller are electrically connected with the circuit board. The buttons are connected with the corresponding button sensors. The scroll wheel is connected with the encoder.

However, the conventional mouse is only used as a general mouse. For controlling the ordinary functions of the video electronics product, it is necessary to use another remoter controller. For example, a remote controller is required to control the channel-selecting operation or volume-adjusting operation of the television. Moreover, when the video game console is used to play games, a joystick is additionally used to control the operations of the games. In other words, the conventional mouse is not user-friendly.

SUMMARY OF THE INVENTION

The present invention provides a joystick-type mouse.

In accordance with an aspect of the present invention, there is provided a joystick-type mouse. The joystick-type mouse includes a main body and a mode detecting assembly. The main body includes a controlling module. The mode detecting assembly includes a coupling member, a posture sensor and a magnetic field sensor. A pivotal part is located at a first side of the coupling member and pivotally coupled with the main body. A magnetic part is located at a second side of the coupling member. The posture sensor and the magnetic field sensor are disposed within the main body and electrically connected with the controlling module. When the posture sensor detects that the main body is in an upright status and the magnetic field sensor detects that the magnetic part is rotated in a direction away from the main body, the main body enters a joystick mode under control of the controlling module. Preferably, the posture sensor is an acceleration sensor. Preferably, the magnetic field sensor is a Hall sensor. Consequently, the main body of the mouse can be used as a joystick.

In an embodiment, the main body further includes a housing. The controlling module, the posture sensor and the magnetic field sensor are disposed within the housing, and the pivotal part is pivotally coupled with the housing.

Preferably, an inner portion of the housing includes a first chamber and a second chamber. The first chamber and the second chamber are in communication with each other. The first chamber is located near the pivotal part. The second chamber is away from the pivotal part. The controlling module, the posture sensor and the magnetic field sensor are disposed within the first chamber. In an embodiment, the controlling module includes a main circuit board and a controller. The controller, the posture sensor and the magnetic field sensor are installed on the main circuit board and electrically connected with the main circuit board. In an embodiment, the magnetic field sensor is located near the pivotal part, the controller is away from the pivotal part, and the posture sensor is arranged between the controller and the magnetic field sensor. In an embodiment, the main circuit board has a top installation surface and a bottom installation surface. The top installation surface is located at a top side of the main circuit board. The bottom installation surface is located at a bottom side of the main circuit board. The controller and the posture sensor are installed on the top installation surface. The magnetic field sensor is installed on the bottom installation surface.

In an embodiment, a notch is located at an end of the first chamber of the housing. The pivotal part is installed in the notch. The magnetic part is allowed to be rotated into the notch. Preferably, two raised blocks are respectively protruded from bilateral sides of a first end of the pivotal part, so that the two raised blocks are pivotally coupled to two lateral walls of the notch. The first end of the pivotal part is away from the magnetic part. Preferably, the pivotal part and the two raised blocks are collaboratively formed as a T-shaped structure.

In an embodiment, the joystick-type mouse further includes a base, and the magnetic part is connected with the base. In an embodiment, the base includes a magnetic connection part, and the magnetic part and the magnetic connection part are magnetically attracted by each other. In an embodiment, the magnetic connection part is located at a middle region of the base, and a curvy recess is formed in the magnetic connection part. The magnetic part is a spherical structure that is protruded from the pivotal part. The magnetic part is connected with the curvy recess. In an embodiment, a first magnetic element is disposed within the magnetic part, and a second magnetic element is disposed within the magnetic connection part. Preferably, the first magnetic element and the second magnetic element are magnets. Consequently, the mouse is user-friendly.

In an embodiment, the joystick-type mouse further includes a remote control module. The remote control is detachably installed within the first chamber and electrically connected with main circuit board and the controller. When the controller receives a start signal from the remote control module, the main body enters a remote control mode under control of the controller. Consequently, the main body of the mouse can be used as a remote controller.

In an embodiment, the main body further includes two buttons, two button sensors, a scroll wheel, an encoder, an optical sensor and a sub-circuit board. The two buttons and the scroll wheel are installed on the housing and located near the second chamber. The sub-circuit board is electrically connected with the main circuit board. The two button sensors, the encoder, The optical sensor and the sub-circuit board are disposed within the second chamber. The two button sensors, the encoder and the optical sensor are electrically connected with the sub-circuit board. The buttons are connected with the corresponding button sensors. The scroll wheel is connected with the encoder.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
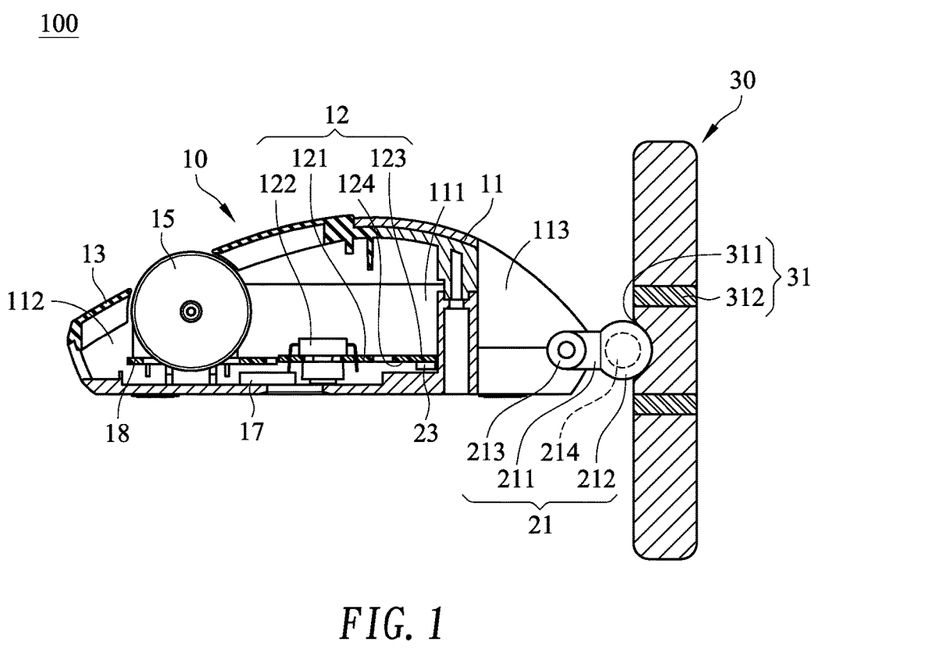
FIG. 1 is a schematic cross-sectional view illustrating a joystick-type mouse according to an embodiment of the present invention of the present invention.
Figure 2:
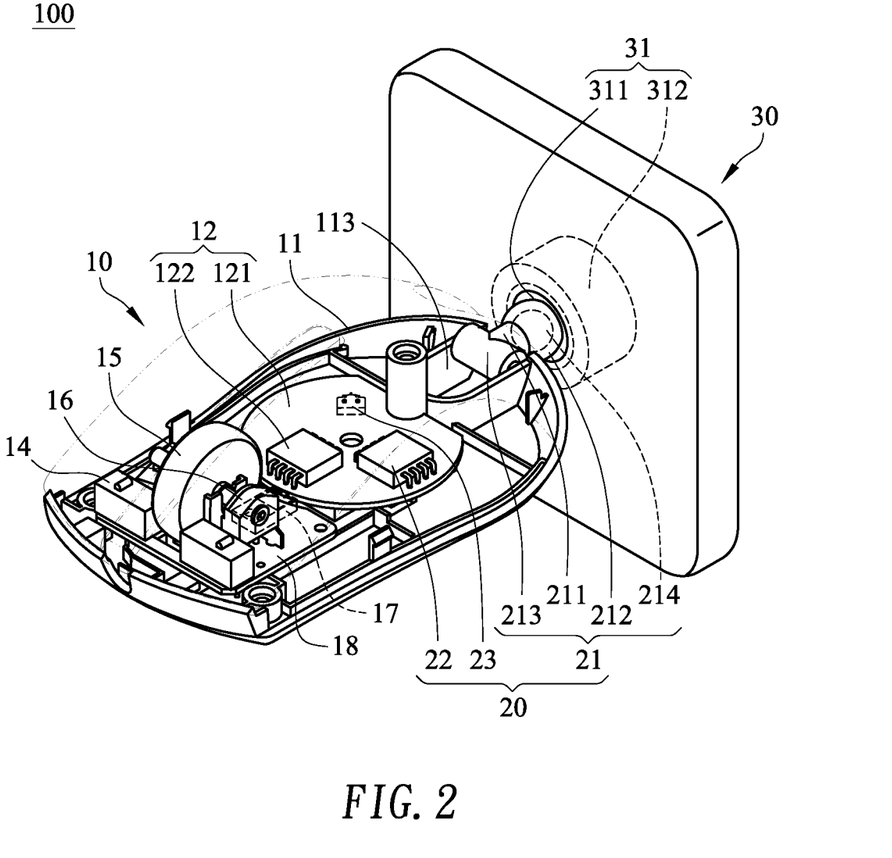
FIG. 2 is a schematic perspective view illustrating the joystick-type mouse according to the embodiment of the present invention of the present invention.

FIG. 1 is a schematic cross-sectional view illustrating a joystick-type mouse according to an embodiment of the present invention of the present invention. FIG. 2 is a schematic perspective view illustrating the joystick-type mouse according to the embodiment of the present invention of the present invention. As shown in FIGS. 1 and 2, the joystick-type mouse 100 comprises a main body 10, a mode detecting assembly 20 and a base 30.

The main body 10 comprises a housing 11, a controlling module 12, two buttons 13, two button sensors 14, a scroll wheel 15, an encoder 16, an optical sensor 17 and a sub-circuit board 18. The inner portion of the housing 11 comprises a first chamber 111 and a second chamber 112. The first chamber 111 and the second chamber 112 are in communication with each other. A notch 113 is located at an end of the first chamber 111 of the housing 11. The second chamber 112 is located beside the first chamber 111 and away from the notch 113. The controlling module 12 is disposed within the first chamber 111 of the housing 11. The controlling module 12 comprises a main circuit board 121 and a controller 122. The main circuit board 121 has a top installation surface 123 and a bottom installation surface 124. The top installation surface 123 is located at a top side of the main circuit board 121. The bottom installation surface 124 is located at a bottom side of the main circuit board 121. The controller 122 is installed on the top installation surface 123 and electrically connected with the main circuit board 121. The two buttons 13 are located beside the second chamber 112 of the housing 11. The scroll wheel 15 is located beside the second chamber 112 of the housing 11 and arranged between the two buttons 13. The button sensors 14, the encoder 16, the optical sensor 17 and the sub-circuit board 18 are disposed within the second chamber 112. The sub-circuit board 18 is electrically connected with the main circuit board 121. The two button sensors 14, the encoder 16 and the optical sensor 17 are electrically connected with the sub-circuit board 18. The buttons 13 are connected with the corresponding button sensors 14. The scroll wheel 15 is connected with the encoder 16.

The mode detecting assembly 20 comprises a coupling member 21, a posture sensor 22 and a magnetic field sensor 23. The coupling member 21 comprises a pivotal part 211 at a first side and a magnetic part 212 at a second side. Two raised blocks 213 are respectively protruded from bilateral sides of a first end of the pivotal part 211, wherein the first end of the pivotal part 211 is away from the magnetic part 212. That is, the pivotal part 211 and the two raised blocks 213 are collaboratively formed as a T-shaped structure. The pivotal part 211 is installed in the notch 113. Moreover, the two raised blocks 213 are pivotally coupled to two lateral walls of the notch 113. Through the two raised blocks 213, the pivotal part 211 is pivotally coupled to the housing 11. Consequently, the coupling member 21 is pivotally coupled to the housing 11. The magnetic part 212 is a spherical structure that is protruded from the pivotal part 211. Moreover, a magnetic element 214 is disposed within the magnetic part 212. For example, the magnetic element 214 is a magnet.

The posture sensor 22 and the magnetic field sensor 23 are disposed within the first chamber 111 of the housing 11 and electrically connected with the main circuit board 121. Consequently, the posture sensor 22 and the magnetic field sensor 23 are electrically connected with the controller 122 through the main circuit board 121. The magnetic field sensor 23 is located near the notch 113. The controller 122 is away from the pivotal part 211. The posture sensor 22 is arranged between the controller 122 and the magnetic field sensor 23. The posture sensor 22 is installed on the top installation surface 123 of the main circuit board 121. The magnetic field sensor 23 is installed on the bottom installation surface 124. In an embodiment, the posture sensor 22 is an acceleration sensor, and the magnetic field sensor 23 is a Hall sensor. The posture sensor 22 can detect whether the posture of the main body 10 is in an upright status or a horizontal status.

The base 30 comprises a magnetic connection part 31. The magnetic connection part 31 is located at a middle region of the base 30. Moreover, a curvy recess 311 is formed in the magnetic connection part 31. The magnetic part 212 of the coupling member 21 is connected with the curvy recess 311. Moreover, a magnetic element 312 is disposed within the magnetic connection part 31. Consequently, the magnetic part 212 and the magnetic connection part 31 are magnetically attracted by each other, and the main body 10 is fixed on the base 30. For example, the magnetic element 312 is a magnet.

Figure 3:
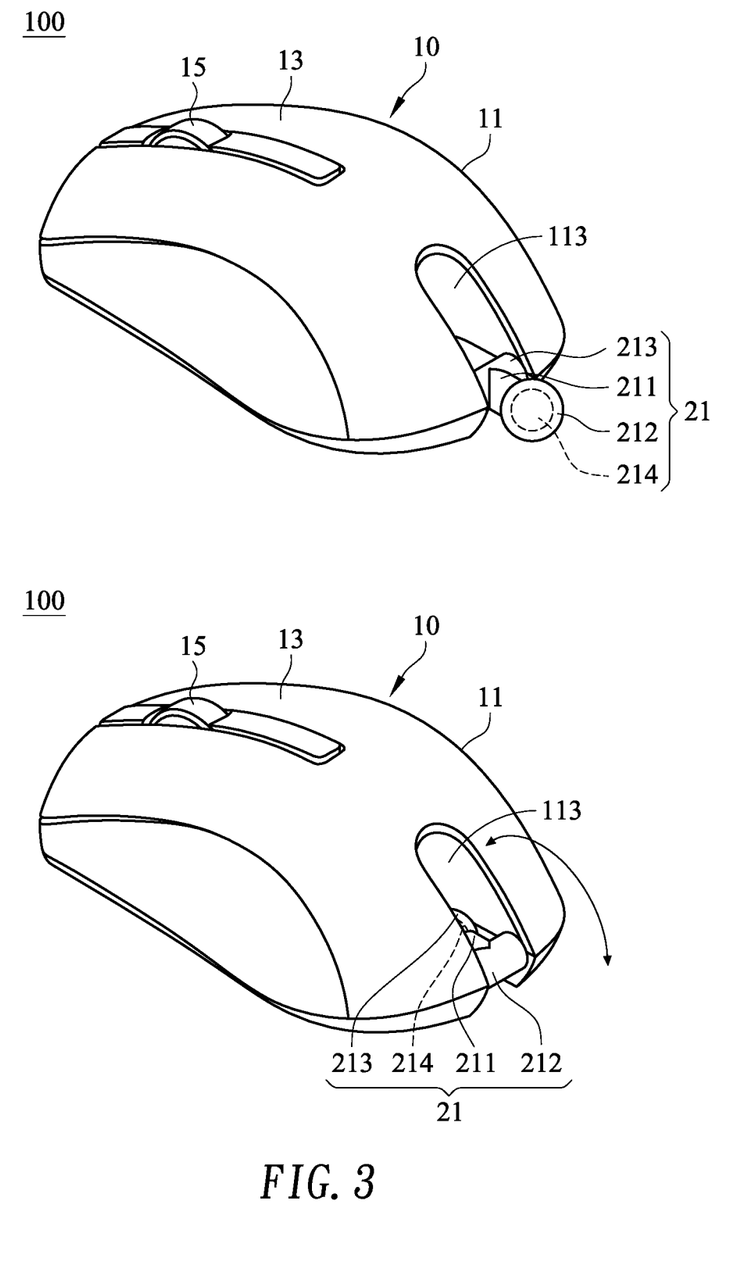
FIG. 3 schematically illustrates a first usage example of the joystick-type mouse according to the embodiment of the present invention.

FIG. 3 schematically illustrates a first usage example of the joystick-type mouse according to the embodiment of the present invention. The magnetic field sensor 23 is capable of detecting whether the magnetic part 212 of the coupling member 21 is rotated into the notch 113 of the main body 10 or the magnetic part 212 is rotated in the direction away from the notch 113.

If the posture sensor 22 detects that the main body 10 of the mouse 100 is placed in a horizontal status, the posture sensor 22 issues a horizontal placement signal to the controller 122. In response to the horizontal placement signal, the main body 10 of the mouse 100 enters a mouse mode under control of the controller 122.

If the posture sensor 22 detects that the main body 10 of the mouse 100 is placed in an upright status, the posture sensor 22 issues an upright placement signal to the controller 122. If the magnetic field sensor 23 detects that the magnetic part 212 of the coupling member 21 is rotated to be away from the notch 113, it means that the magnetic part 212 is away from the main body 10. Meanwhile, the magnetic field sensor 23 issues an electric signal to the controller 122. When both of the upright placement signal and the electric signal are received by the controller 122, the main body 10 of the mouse 100 is switched to be in a joystick mode. In the joystick mode, the buttons 13 and the scroll wheel 15 of the mouse 100 are defined as the operating keys and the roller of a joystick by the controller 122 through the button sensors 14 and the encoder 16. Moreover, when the posture sensor 22 detects a movement position of the main body 10, the posture sensor 22 issues a movement signal to the controller 122. The movement signal is transmitted from the controller 122 to a host that is in communication with the controller 122. Meanwhile, the mouse 100 is used as a joystick. Under this circumstance, the applications of the mouse 100 are expanded.

Figure 4:
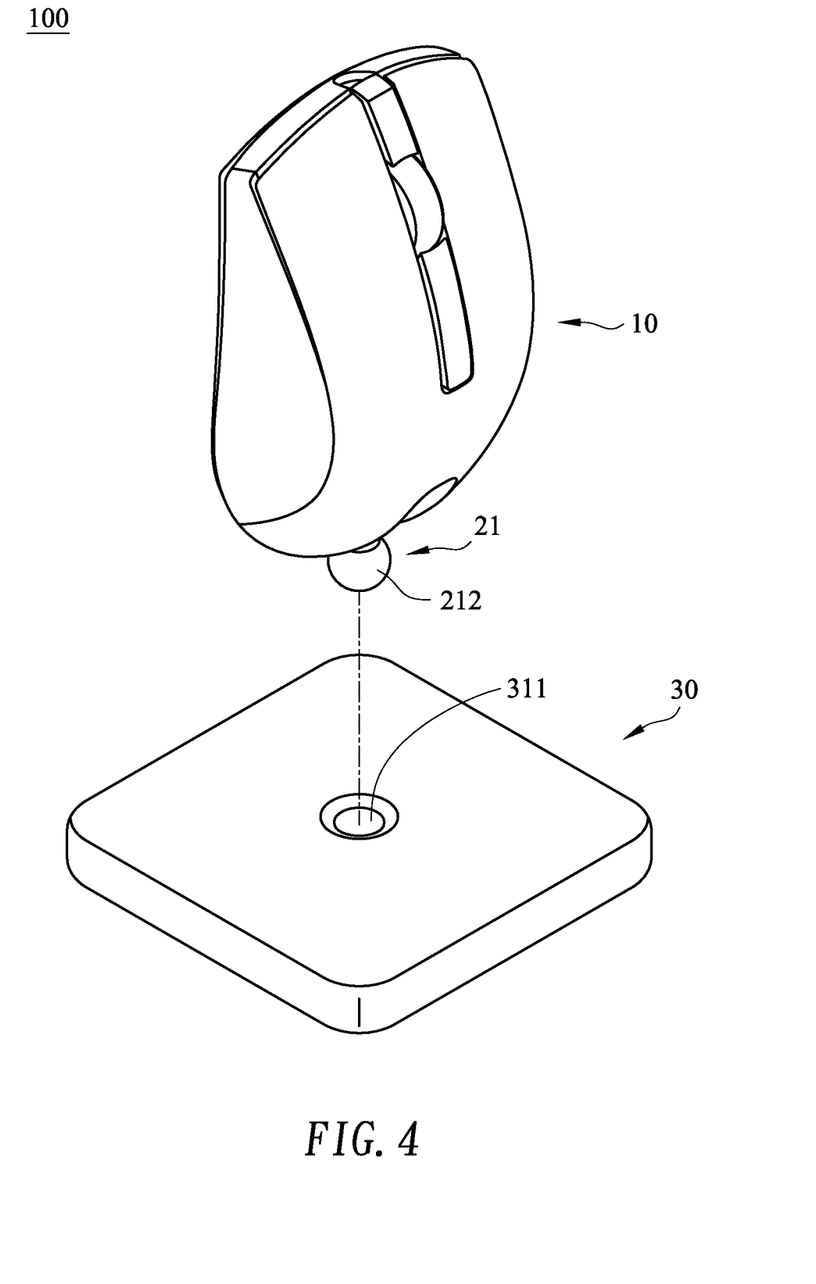
FIG. 4 schematically illustrates a second usage example of the joystick-type mouse according to the embodiment of the present invention.

FIG. 4 schematically illustrates a second usage example of the joystick-type mouse according to the embodiment of the present invention. When the main body 10 of the mouse 100 is used as the joystick, the magnetic part 212 of the coupling member 21 and the magnetic connection part 31 of the base 30 are magnetically attracted by each other. Consequently, the main body 10 of the mouse 100 is fixed on the base 30. Under this circumstance, the mouse 100 can be operated more easily.

Figure 5:
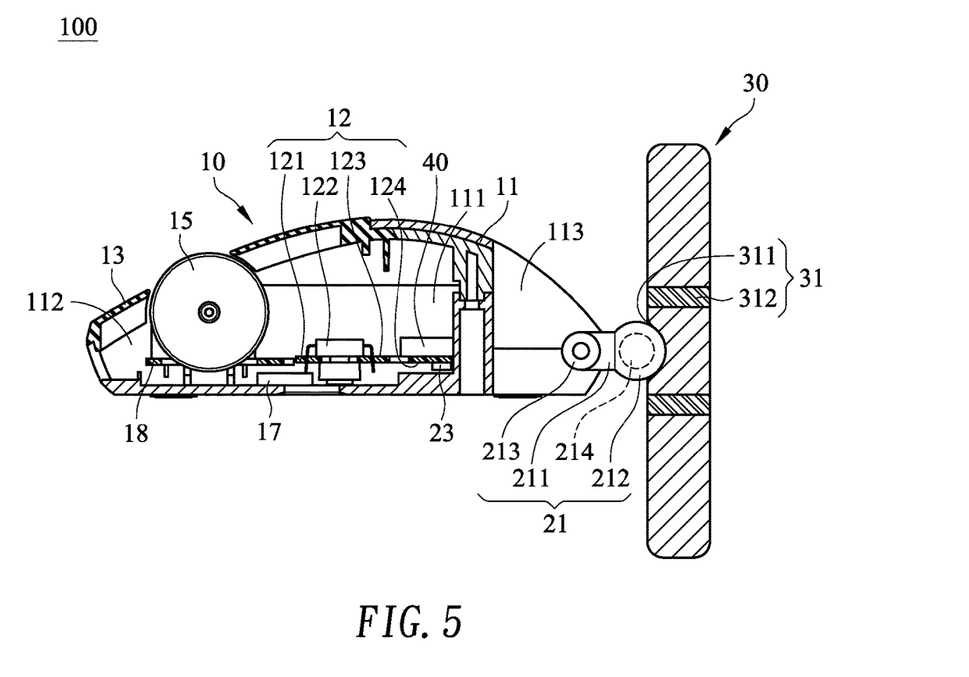
FIG. 5 is a schematic cross-sectional view illustrating a joystick-type mouse according to another embodiment of the present invention of the present invention.

FIG. 5 is a schematic cross-sectional view illustrating a joystick-type mouse according to another embodiment of the present invention of the present invention. As shown in FIG. 5, the mouse 100 further comprises a remote control module 40. The remote control module 40 is detachably installed in the first chamber 111 of the housing 11 and electrically connected with the main circuit board 121. The remote control module 40 is electrically connected with the controller 122 through the main circuit board 121. When the controller 122 receives a start signal from the remote control module 40, the main body 10 of the mouse 100 enters a remote control mode. In the remote control mode, the buttons 13 and the scroll wheel 15 of the mouse 100 are defined as the operating keys and the roller of a remote controller by the controller 122 through the button sensors 14 and the encoder 16. By pressing the buttons 13, the simple function such as a channel-selecting operation is performed. By rotating the scroll wheel 15, a volume-adjusting operation is performed. Under this circumstance, the mouse 100 can be used as a remote controller of a television or any other appropriate electric product.

From the above descriptions, the mouse of the present invention has the following features. Firstly, the main body 10 of the mouse 100 can be switched to the joystick mode through the controlling module 12 and the mode detecting assembly 20. Consequently, the main body 10 of the mouse 100 is used as a joystick. Secondly, the main body 10 of the mouse 100 is fixed on the base 30 through the magnetic attraction between the magnetic part 212 of the coupling member 21 and the base 30. Consequently, the mouse 100 has the easy-to-use benefit. Thirdly, the main body 10 of the mouse 100 can be switched to the remote control mode through the controller 122 and the remote control module 40. Consequently, the main body 10 of the mouse 100 is used as a remote controller.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A joystick-type mouse, comprising:
a main body comprising a controlling module; and
a mode detecting assembly comprising a coupling member, a posture sensor and a magnetic field sensor, wherein a pivotal part is located at a first side of the coupling member and pivotally coupled with the main body, a magnetic part is located at a second side of the coupling member, and the posture sensor and the magnetic field sensor are disposed within the main body and electrically connected with the controlling module,
wherein when the posture sensor detects that the main body is in an upright status and the magnetic field sensor detects that the magnetic part is rotated in a direction away from the main body, the main body enters a joystick mode under control of the controlling module.

2. The joystick-type mouse according to claim 1, wherein the main body further comprises a housing, wherein the controlling module, the posture sensor and the magnetic field sensor are disposed within the housing, and the pivotal part is pivotally coupled with the housing.

3. The joystick-type mouse according to claim 2, wherein an inner portion of the housing comprises a first chamber and a second chamber, and the first chamber and the second chamber are in communication with each other, wherein the first chamber is located near the pivotal part, the second chamber is away from the pivotal part, and the controlling module, the posture sensor and the magnetic field sensor are disposed within the first chamber.

4. The joystick-type mouse according to claim 3, wherein the controlling module comprises a main circuit board and a controller, wherein the controller, the posture sensor and the magnetic field sensor are installed on the main circuit board and electrically connected with the main circuit board.

5. The joystick-type mouse according to claim 4, wherein the magnetic field sensor is located near the pivotal part, the controller is away from the pivotal part, and the posture sensor is arranged between the controller and the magnetic field sensor.

6. The joystick-type mouse according to claim 5, wherein the main circuit board has a top installation surface and a bottom installation surface, wherein the top installation surface is located at a top side of the main circuit board, and the bottom installation surface is located at a bottom side of the main circuit board, wherein the controller and the posture sensor are installed on the top installation surface, and the magnetic field sensor is installed on the bottom installation surface.

7. The joystick-type mouse according to claim 6, wherein the joystick-type mouse further comprises a remote control module, and the remote control is detachably installed within the first chamber and electrically connected with main circuit board and the controller, wherein when the controller receives a start signal from the remote control module, the main body enters a remote control mode under control of the controller.

8. The joystick-type mouse according to claim 6, wherein the main body further comprises two buttons, two button sensors, a scroll wheel, an encoder, an optical sensor and a sub-circuit board, wherein the two buttons and the scroll wheel are installed on the housing and located near the second chamber, the sub-circuit board is electrically connected with the main circuit board, and the two button sensors, the encoder, the optical sensor and the sub-circuit board are disposed within the second chamber, wherein the two button sensors, the encoder and the optical sensor are electrically connected with the sub-circuit board, the buttons are connected with the corresponding button sensors, and the scroll wheel is connected with the encoder.

9. The joystick-type mouse according to claim 3, wherein a notch is located at an end of the first chamber of the housing, wherein the pivotal part is installed in the notch, and the magnetic part is allowed to be rotated into the notch.

10. The joystick-type mouse according to claim 9, wherein two raised blocks are respectively protruded from bilateral sides of a first end of the pivotal part, so that the two raised blocks are pivotally coupled to two lateral walls of the notch, wherein the first end of the pivotal part is away from the magnetic part.

11. The joystick-type mouse according to claim 10, wherein the pivotal part and the two raised blocks are collaboratively formed as a T-shaped structure.

12. The joystick-type mouse according to claim 1, wherein the joystick-type mouse further comprises a base, and the magnetic part is connected with the base.

13. The joystick-type mouse according to claim 12, wherein the base comprises a magnetic connection part, and the magnetic part and the magnetic connection part are magnetically attracted by each other.

14. The joystick-type mouse according to claim 13, wherein the magnetic connection part is located at a middle region of the base, and a curvy recess is formed in the magnetic connection part, wherein the magnetic part is a spherical structure that is protruded from the pivotal part, and the magnetic part is connected with the curvy recess.

15. The joystick-type mouse according to claim 14, wherein a first magnetic element is disposed within the magnetic part, and a second magnetic element is disposed within the magnetic connection part.

16. The joystick-type mouse according to claim 15, wherein the first magnetic element and the second magnetic element are magnets.

17. The joystick-type mouse according to claim 1, wherein the posture sensor is an acceleration sensor.

18. The joystick-type mouse according to claim 1, wherein the magnetic field sensor is a Hall sensor.

* * * * *